United States Patent
Bhatia et al.

(10) Patent No.: US 10,680,933 B2
(45) Date of Patent: Jun. 9, 2020

(54) ELECTRONIC MAIL SYSTEM ROUTING CONTROL

(71) Applicant: Microsoft Technology Licensing, LLC, Redmond, WA (US)

(72) Inventors: Akash Bhatia, Redmond, WA (US); Suneetha Dhulipalla, Sammamish, WA (US); Hsien-chieh Cheng, Newcastle, WA (US); Dheeraj Kumar Jain, Redmond, WA (US); Nagaraju Palla, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 15/423,023

(22) Filed: Feb. 2, 2017

(65) Prior Publication Data

US 2018/0219763 A1    Aug. 2, 2018

(51) Int. Cl.
| | | |
|---|---|---|
| *H04L 12/721* | (2013.01) | |
| *H04L 12/26* | (2006.01) | |
| *H04L 12/58* | (2006.01) | |
| *H04L 12/727* | (2013.01) | |
| *H04L 12/733* | (2013.01) | |
| *H04L 12/751* | (2013.01) | |

(52) U.S. Cl.
CPC ........ *H04L 45/123* (2013.01); *H04L 43/0858* (2013.01); *H04L 45/121* (2013.01); *H04L 51/34* (2013.01); *H04L 45/02* (2013.01); *H04L 45/126* (2013.01)

(58) Field of Classification Search
CPC ..... H04L 1/00; H04L 45/123; H04L 43/0858; H04L 45/02; H04L 45/126; H04L 51/00; H04L 51/04; H04L 45/70; H04L 47/12; H04L 45/121; H04L 45/28
See application file for complete search history.

(56) References Cited

U.S. PATENT DOCUMENTS

| | | | |
|---|---|---|---|
| 6,738,813 B1 * | 5/2004 | Reichman | G06Q 10/06 709/223 |
| 7,843,842 B2 | 11/2010 | Ethier et al. | |
| 8,339,965 B2 | 12/2012 | Zhang et al. | |
| 8,341,297 B2 | 12/2012 | Swildens et al. | |
| 9,154,394 B2 | 10/2015 | Ko et al. | |
| 9,197,624 B2 | 11/2015 | Mansour et al. | |
| 9,262,370 B2 | 2/2016 | Hofstaedter et al. | |
| 2003/0018769 A1 | 1/2003 | Foulger et al. | |
| 2004/0059789 A1 * | 3/2004 | Shum | |
| 2007/0250625 A1 | 10/2007 | Titus | |

(Continued)

OTHER PUBLICATIONS

"MapLatency", http://www.maplatency.com/ , Retrieved Date: Sep. 23, 2016, 2 pages.

(Continued)

*Primary Examiner* — Marsha D Banks Harold
*Assistant Examiner* — Dharmesh J Patel
(74) *Attorney, Agent, or Firm* — Christopher J. Volkmann; Kelly, Holt & Christenson, PLLC

(57) ABSTRACT

Route information identifying servers that an e-mail message travels through, along with per-hop latency information, is aggregated. A choke point or other latency-related issue is identified and a control signal is generated to control the e-mail system based upon the identified choke point or other latency-related issue.

20 Claims, 12 Drawing Sheets

(56) References Cited

U.S. PATENT DOCUMENTS

| | | |
|---|---|---|
| 2009/0016236 A1 | 1/2009 | Alcala et al. |
| 2010/0306323 A1* | 12/2010 | Gourevitch ......... H04L 43/0852 |
| | | 709/206 |
| 2011/0295890 A1 | 12/2011 | Gracieux |
| 2014/0280884 A1 | 9/2014 | Searle et al. |
| 2015/0149609 A1 | 5/2015 | Zou et al. |
| 2015/0281028 A1* | 10/2015 | Akhter et al. |

OTHER PUBLICATIONS

"Office 365 Client Performance Analyzer", Retrieved Date: Sep. 23, 2016, 17 pages.

* cited by examiner

FIG. 4

ELECTRONIC MAIL SYSTEM ROUTING CONTROL

BACKGROUND

Computing systems are currently in wide use. Some computing systems host services, such as electronic mail services, where users can perform electronic mail functions.

Electronic mail functions can include such things as authoring, sending and receiving electronic mail (e-mail) messages along with attachments. They can also include such things as setting filters, configuring mailboxes, and a wide variety of other things.

When a user sends an e-mail message to another user, it is common for the e-mail message to be sent through a network of servers before it arrives at its destination. The message traveling from one server to another is often referred to as a "hop". Some client computing systems include client e-mail components (or client email computing systems) that monitor latency corresponding to each hop. For instance, when a user sends an e-mail message to a destination or recipient, the e-mail message may travel from a first server, to a second server, to yet a third server (or more) before being delivered to the recipient's inbox. All of the servers along the route may be controlled by a particular company or organization, or different servers may be controlled by different companies or organizations.

In one example, the client e-mail computing system monitors the latency corresponding to each hop. That is, it can receive information indicative of when the e-mail message arrived at a particular server, and when it was sent by that server and arrived at the next subsequent (or next adjacent) server along the route. The time corresponding to this "hop" can be referred to as the latency corresponding to that hop (or per hop latency). This information is stored at the client e-mail computing system.

The discussion above is merely provided for general background information and is not intended to be used as an aid in determining the scope of the claimed subject matter.

SUMMARY

Route information identifying servers that an e-mail message travels through, along with per-hop latency information, is aggregated. A choke point or other latency-related issue is identified and a control signal is generated to control the e-mail system based upon the identified choke point or other latency-related issue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-6 show examples of user interface displays that can be generated.

DETAILED DESCRIPTION

Figure 1:
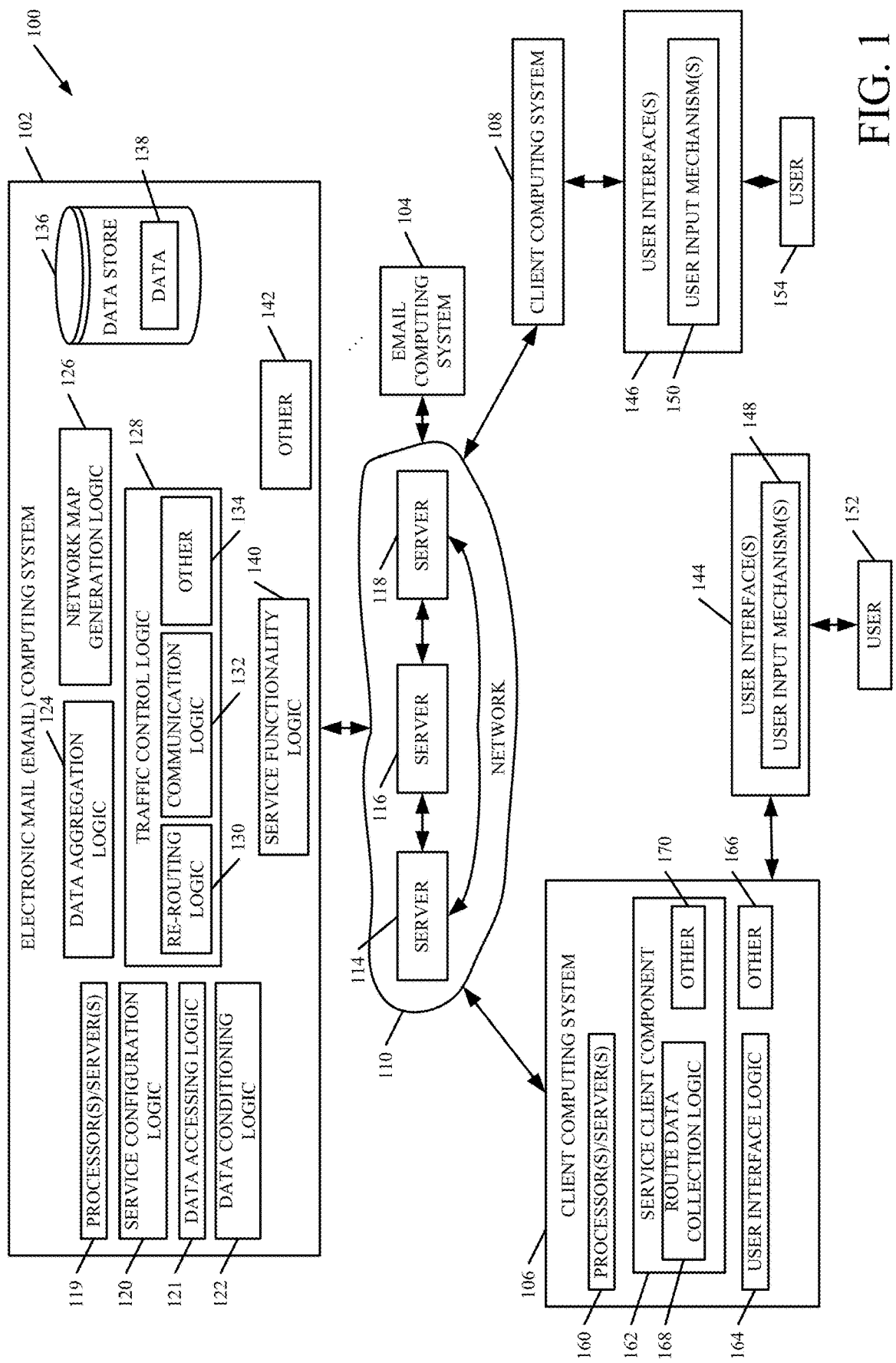
FIG. 1 is a block diagram of one example of an electronic mail (e-mail) computing system architecture.

FIG. 1 is a block diagram of one example of an electronic mail (e-mail) computing system architecture 100. Architecture 100 illustratively includes e-mail computing systems 102 and 104 as well as a number of client computing systems 106-108. Computing systems 104-108 can be connected to one another through a network 110. Network 110 can, itself, include a plurality of servers or server environments 114, 116 and 118, which can, themselves, be connected to one another within network 110.

E-mail computing systems 102-104 can illustratively host different e-mail systems. They can be similar or different e-mail systems. For the sake of the present description, it will be assumed that they are similar e-mail systems, so only e-mail computing system 102 is described in more detail.

E-mail computing system 102 illustratively includes processors or servers 119, service configuration logic 120, data accessing logic 121, data conditioning logic 122, data aggregation logic 124, network map generation logic 126, traffic control logic 128 (which, itself, can include re-routing logic 130, communication logic 132 and other items 134). E-mail computing system 102 can also illustratively include data store 136 which stores a wide variety of different types of data 138, service functionality logic 140, and it can include other items 142.

It can also be seen in the example shown in FIG. 1 that client computing systems 106-108 illustratively generate user interfaces 144-146, with user input mechanisms 148-150 for interaction by users 152-154. Users 152-154 illustratively interact with user input mechanisms 148-150 in order to manipulate client computing systems 106-108, respectively. In one example, users 152-154 can also interact with the user input mechanisms in order to control and manipulate e-mail computing system 102.

Client computing systems 106-108 can also be similar or different. In the present example, it will be assumed that they are similar systems so that only client computing system 106 is described in more detail. Client computing system 106 illustratively includes one or more processors or servers 160, service client component 162, user interface logic 164 and it can include a wide variety of other items 166. Service client component 162 can include route data collection logic 168, and it can also include other items 170. Before describing the operation of architecture 100 in more detail, a brief overview of some of the items in architecture 100, and their operation, will first be provided.

Service functionality 140 illustratively interacts with the client computing systems 102-108 in order to allow users to perform service functionality, such as authoring, sending and receiving e-mail messages and attachments, configuring folders and filters, etc. Service configuration logic 120 illustratively allows the user to configure the service (such as by allowing administrative users to configure various settings that dictate e-mail routing, Internet service provider—ISP—usage, among other things). Data accessing logic 121 illustratively accesses route data collected by route data collection logic 168 on client computing system 106. The route data can identify the various servers that e-mail messages, sent from client computing system 106, travel through in order to arrive at the destination computing system of a recipient. That information can also include a representation of the per-hop latency indicative of the latency of the message in traveling from server-to-server. Data accessing logic 121 can also access configuration information indicative of how the e-mail computing system is configured for the user, how the user's client computing system is configured, among other things. Data conditioning logic 122 illustratively conditions or scrubs the data, such as by removing invalid data, or other data that is not intended to be used. Data aggregation logic 124 illustratively aggregates the data (collected from different client computing systems) for a given tenant across various metrics (some of which will be described below). Network map generation logic 126 can perform a variety of different types of analysis on the aggregated data (as described below with respect to FIGS. 2-3) and traffic control logic 128 can illustratively generate control signals in order to control e-mail traffic, based upon the aggregated and analyzed data. For instance, re-routing logic 130 can generate control signals for service functionality logic 150 so that e-mail messages are re-routed around choke points that may be identified based upon the aggregated routing data. Communication logic 132 may be used to communicate with other e-mail computing systems 104 to alert them to problems with their servers, or other issues. These and other things are described in greater detail below with respect to FIGS. 2-3.

Figure 2:
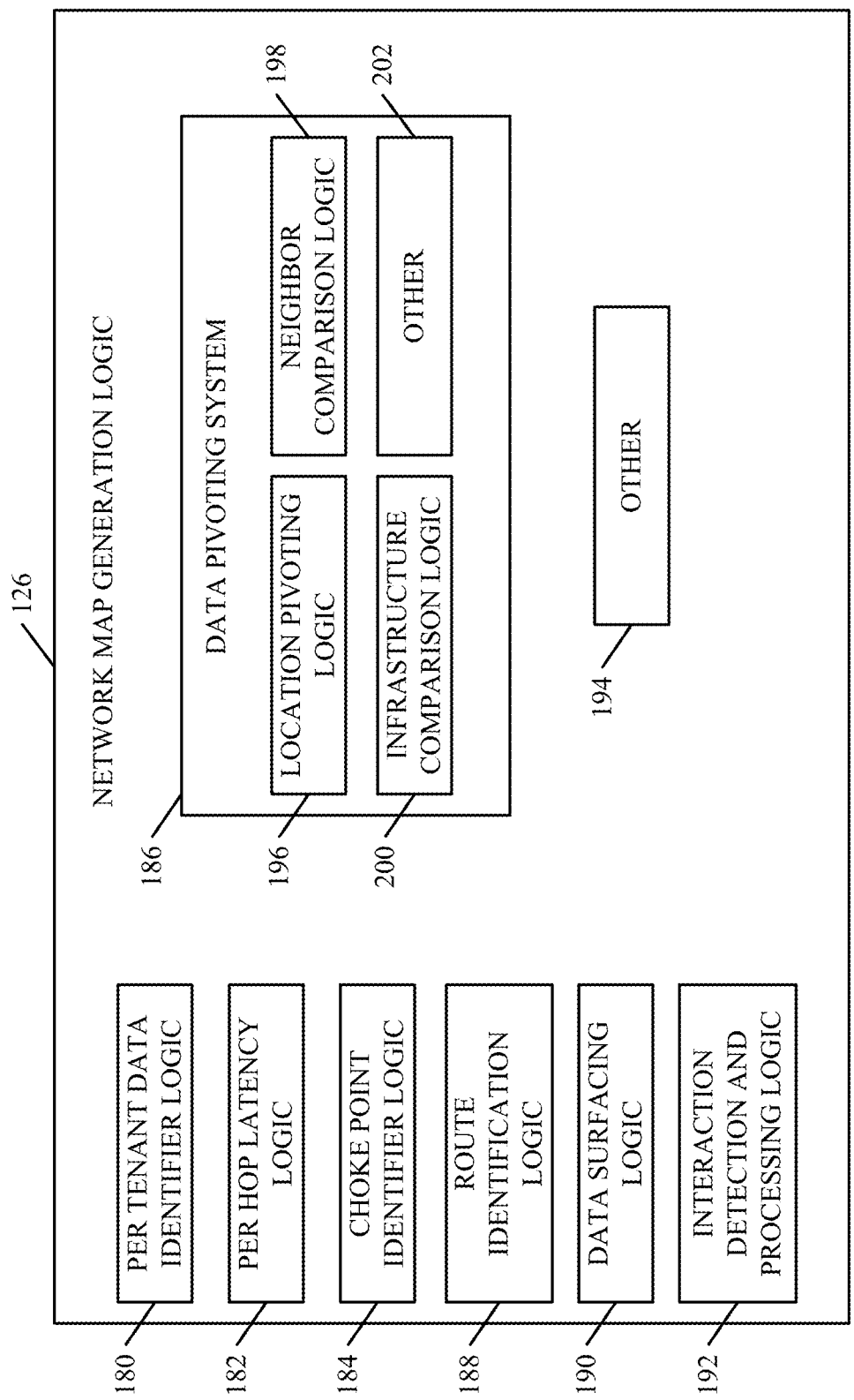
FIG. 2 is a block diagram showing one example of network map generation logic in more detail.

FIG. 2 shows one example of network map generation logic 126, in more detail. In the example shown in FIG. 2, logic 126 illustratively includes per tenant data identifier logic 180, per-hop latency logic 182, choke point identifier logic 184, data pivoting system 186, route identification logic 188, data surfacing logic 190, interaction detection and processing logic 192, and it can include other items 194. System 186, itself, can include location pivoting logic 196, neighbor comparison logic 198, infrastructure comparison logic 200, and it can include a wide variety of other items 202. Per tenant data identifier logic 190 illustratively accesses data store 136 and identifies data 138 corresponding to a particular tenant. Route identification logic 188 illustratively identifies the particular route or routes that the e-mail messages are taking, which may be influenced by the configuration settings for the e-mail system. Per-hop latency logic 182 analyzes the data to identify the per-hop latency corresponding to e-mail messages sent by that tenant to other recipients along the various routes (the latency corresponding to the email message passing from one server to the next adjacent server along the route). Choke point identifier logic 184 illustratively identifies any choke points (such as servers that are having an undesirably long latency, other structural items, such as cables that may have been damaged, or other choke points that are undesirably delaying e-mail messages sent by the tenant to recipients). It will be noted that the recipients can either be within the same tenant or in different tenants and either using the same e-mail system or a different system.

Data pivoting system 186 can illustratively analyze and pivot the data based on various criteria. For instance, in the example shown in FIG. 2, location pivoting logic 196 can pivot the data to identify metrics or trends corresponding to locations (such as locations of the recipients, the locations of the servers on the route, the locations of where the messages originate from, etc. Neighbor comparison logic 198 illustratively compares the tenant's data to data corresponding to neighboring tenants (such as those in the same general, physical location, such as those using the same ISP, such as those with the same configuration settings, etc.). Infrastructure comparison logic 200 compares the tenant data with other tenants having a similar or different infrastructure. For instance, logic 200 can identify differences in infrastructure (such as different ISPs, different configuration settings, different equipment, etc.) for two different tenants and then compare the data for those two tenants to identify which of them has longer latencies, or other issues. Data surfacing logic 190 can then surface the comparison data or surface suggested changes to one of the tenants to improve the performance of the e-mail system for that tenant.

In doing so, data surfacing logic 190 can generate a visualization or other mechanism for surfacing the data generated by network map generation logic 126, or other items in e-mail computing system 102, either for traffic control logic 128 so that it can generate control signals based on that information, or for user interaction (such as by an end user or an administrative user), or both. Interaction detection and processing logic 192 illustratively detects any user interaction with the data that is surfaced for the user, and performs any processing based on that interaction. For instance, it may be that a user actuates a drill actuator, in which case logic 192 can drill down further to generate a more detailed representation of the data that the user drilled into. The user may also drill up so that logic 192 generates a less detailed or more generalized representation of the data. It may navigate the user to another page based on the user interaction, or it may perform a wide variety of other processing steps based on the user interaction. Some visualizations and examples of user interactions are described in greater detail below with respect to FIGS. 4-6.

Figure 3A:
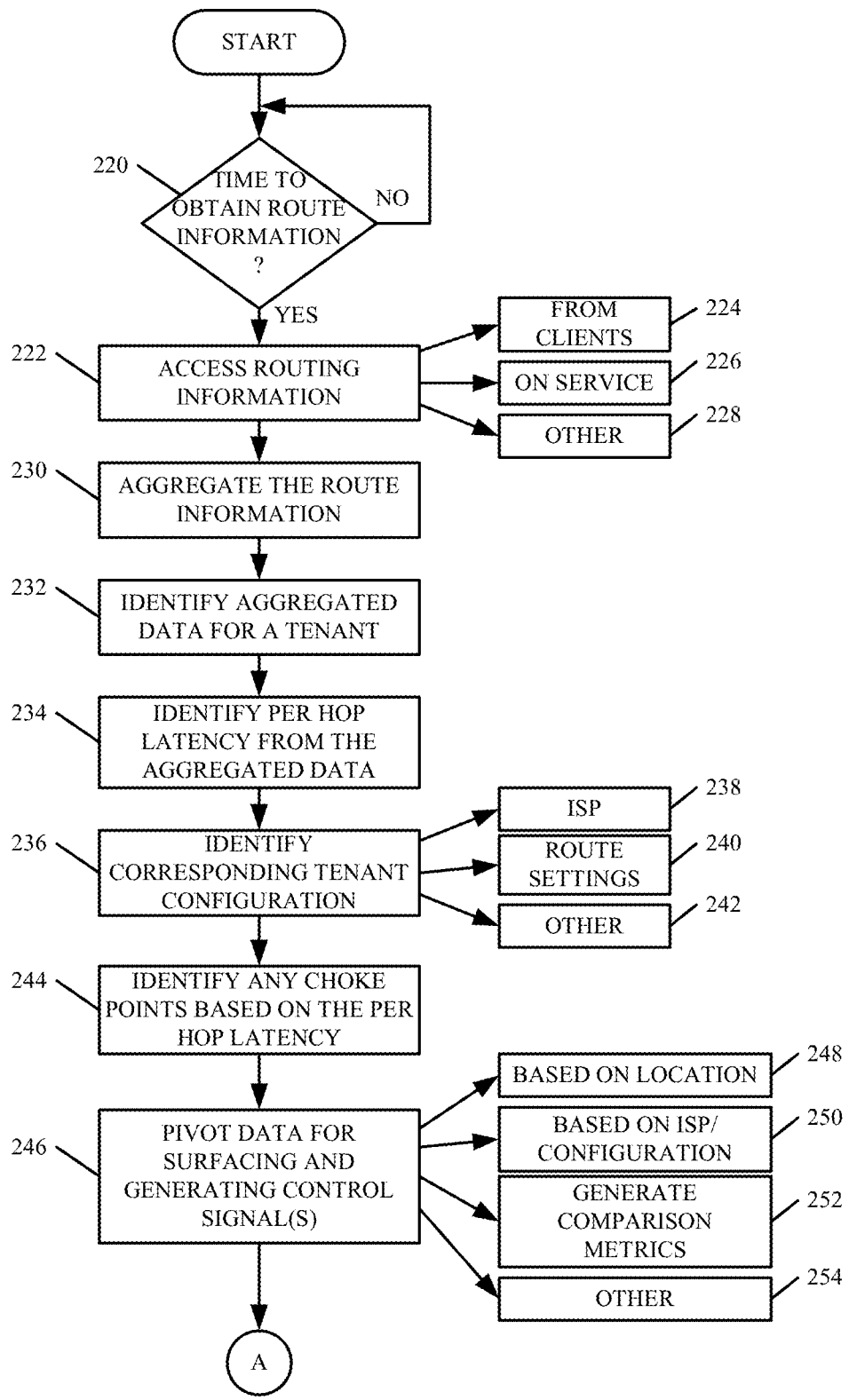
FIGS. 3A and 3B (collectively referred to herein as FIG. 3) show one example of a flow diagram illustrating the operation of the architecture illustrated in FIG. 1 in surfacing information and generating control signals based upon aggregated data.
Figure 3B:
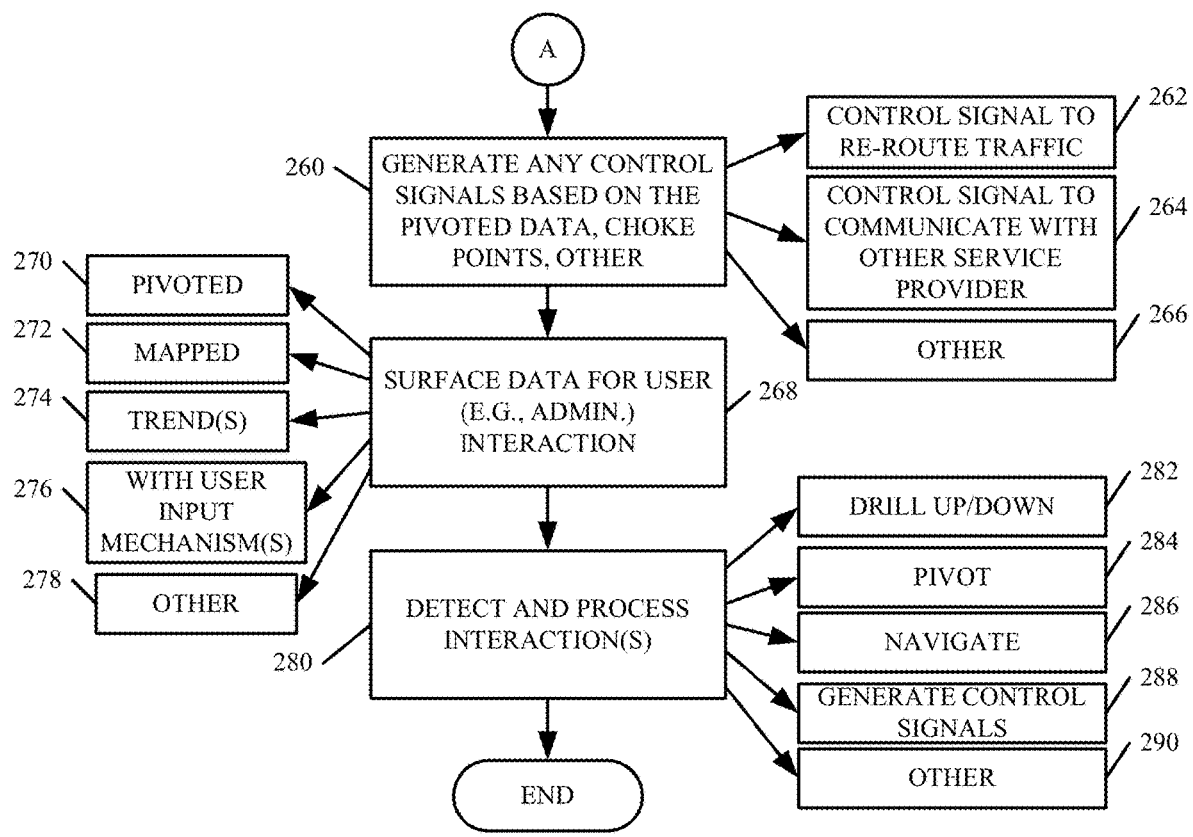

FIGS. 3A and 3B (collectively referred to herein as FIG. 3) show a flow diagram illustrating one example of the operation of architecture 100, and network map generation logic 126, in accessing, aggregating, and using the routing data collected by service client components 162 in the various client computing systems. In one example, data accessing logic 121 first determines whether it is time to obtain route information from the various client computing systems 106-108. This can be done based on elapsed time since the data was last accessed, it can be done based on various trigger inputs, or it can be done in a wide variety of other ways. Determining whether it is time to obtain the route information is indicated by block 220 in the flow diagram of FIG. 3.

If so, then data accessing logic 128 illustratively obtains the route data collected by route data collection logic 168 at the various client computing systems 106-108. In addition, there may be additional route data (such as configuration data, or other data) stored at the e-mail computing system 102. Accessing the route information is indicated by block 222. Accessing it from the clients is indicated by block 224 and accessing it on the service is indicated by block 226. It can be accessed in other ways as well, and this is indicated by block 228.

Data conditioning logic 122 can condition the data and data aggregation logic 124 illustratively aggregates the route information as desired. It can aggregate the route information on a per-tenant basis, and/or on a per-user basis, or in a wide variety of other ways. Aggregating the route information is indicated by block 230 in the flow diagram of FIG. 3.

Per-tenant data identifier logic 180 (in network map generation logic 126, shown in FIG. 2) then identifies the aggregated data for a particular tenant. This is indicated by block 232. For instance, data aggregation logic 124 can aggregate the data on a per-tenant basis and store it as data 138 in data store 136. In that case, per-tenant data identifier logic 180 accesses the data 138 in data store 136 that has been aggregated for the particular tenant under consideration.

Per-hop latency logic 182 then identifies per-hop latency from the aggregated data. This is indicated by block 234. By way of example, logic 182 may identify the average latency per-hop for e-mails sent by the tenant. It may identify the individual hops (e.g., hops between individually identified servers) and identify a metric indicative of latency for each individual hop (such as for e-mail messages traveling from one particular server to another particular server along the route). The per-hop latency can be identified in a wide variety of other ways as well. This information can be used to identify the per-hop latency for individual servers.

Service configuration logic 120 can also identify the tenant configuration for the particular tenant under analysis. This is indicated by block 236. For instance, it can identify the Internet service provider 238 that the tenant is using. It can identify any route settings 240 that may influence the particular route over which e-mail messages travel when sent by a user to a recipient. It can identify a wide variety of other tenant configuration settings as well, and this is indicated by block 242.

Choke point identifier logic 184 can identify choke points corresponding to the tenant. This is indicated by block 244. For instance, where the per-hop latency on a particular hop exceeds an expected latency, this may indicate that the server on the receiving or sending side of that hop is a choke point. As an example, the sending server may be overwhelmed by traffic or may have a structural problem that inhibits its performance. The same may be true of the receiving server, or of the mechanisms (e.g., cables or other hardware or software items) that connect those two servers. The unexpected latency may be identified in various ways as well. For instance, it may be a latency that exceeds the average latency of the other hops on the route by a certain amount. It may be a latency that exceeds a threshold value, or it may be identified as undesirably excessive in other ways as well.

Data pivoting system 186 can perform further analysis on the data, and can also illustratively pivot it in various desired ways. Pivoting the data for surfacing and generating control signals is indicated by block 246 in the flow diagram of FIG. 3. Location pivoting logic 196, for example, can pivot the data based on location (such as based on the location of the tenant sending and receiving messages, based upon the recipients of, or authors, of messages that are sent or received, respectively, by the tenant, based on the location of servers in the route, or based upon other locations). Pivoting the data based on location is indicated by block 248.

Data pivoting logic 186 can use infrastructure comparison logic 200 to pivot the data based upon different items of infrastructure that are used and compare that latency to tenants that have other items of infrastructure. For instance, it can pivot the data based upon the ISP or configuration settings of various tenants. This is indicated by block 250. It can also generate a comparison signal indicative of how the tenant under analysis compares to other tenants, given their infrastructure (given the ISP being used, the configuration settings being used, etc.).

Neighbor comparison logic 198 can generate a comparison signal indicative of how neighboring tenants compare with respect to latency times, or with respect to other metrics. Again, neighboring tenants can be identified as those that are in a similar geographic location, as those having similar configurations, as those of similar sizes (in terms of users, user devices, etc.) or in other ways. Generating a comparison metric is indicated by block 252 in the flow diagram of FIG. 3. Data pivoting system 186 can pivot the data in a wide variety of other ways as well, and this is indicated by block 254.

Once the data has been pivoted based on the various metrics or criteria, and once any desired analysis is performed, the results are provided to traffic control logic 128 to generate any desired control signals based on the pivoted data, the choke points, etc. This is indicated by block 260 in the flow diagram of FIG. 3. In one example, re-routing logic 130 generates control signals to control e-mail system 102 to re-route e-mail traffic around any choke points (e.g., around any servers that are experiencing undesirably high latency). Generating control signals to re-route traffic is indicated by block 262.

It may be that e-mail computing system 102 does not have control over some of the servers through which the e-mail travels. Therefore, if one of those servers is experiencing latency problems, then communication logic 132 can generate control signals to communicate with an owner of the problematic server (e.g., with another service provider) informing them of the latency issues with the server, so that they can re-route traffic or take remedial action. Generating control signals to communicate with another service provider is indicated by block 264 in the flow diagram of FIG. 3. The control signals can be generated in a wide variety of other ways as well, and this is indicated by block 266.

Data surfacing logic 190 then generates a representation of any or all of the data that was pivoted by data pivoting system 186, of the choke points identified by choke point identifier logic 184, of the route identified by route identification logic 188, of the per-hop latency identified by per-hop latency logic 182, and/or any other information that may be surfaced. It can then be surfaced for interaction by a user (such as an administrative user, an end user, etc.). Surfacing data for user interaction is indicated by block 268 in the flow diagram of FIG. 3. Surfacing the pivoted data is indicated by block 270. Surfacing the data on a map is indicated by block 272 (and some examples of this are described below). Surfacing trends identified based on the data is indicated by block 274, and surfacing the data with user input mechanisms that a user can interact with is indicated by block 276. It will be appreciated that the data can be surfaced in a wide variety of other ways as well, and this is indicated by block 278.

Interaction detection and processing logic 192 then detects user interaction with the surfaced data representation and processes that interaction. This is indicated by block 280. For instance, it may be that the data is surfaced with drill up/down actuators so that when a user interacts with those actuators, the user can drill further down into the data to see a more detailed representation of the data, or to drill up to see a more general representation of the data. Drilling up and down relative to the data based on the user interaction is indicated by block 282. The data can also be provided with pivot actuators so that the user can pivot the data based on other criteria. Pivoting the data based on user interaction with a pivot actuator is indicated by block 284 in the flow diagram of FIG. 3. The data can also be provided with navigate actuators so that the user can navigate to other representations of the data or other sites. Navigating the user based on the detected user interaction is indicated by block 286. The user can also be provided with one or more user input mechanisms that can be actuated in order to specifically control a portion of an e-mail system, an Internet service provider, a communication system, or any of a variety of other controlled systems. Generating a control signal based upon the detected user interaction is indicated by block 288.

It will also be appreciated that many other user interactions can be detected, and a wide variety of additional processing can be performed based upon those detected user interactions. This is indicated by block 290 in the flow diagram of FIG. 3.

Figure 4:
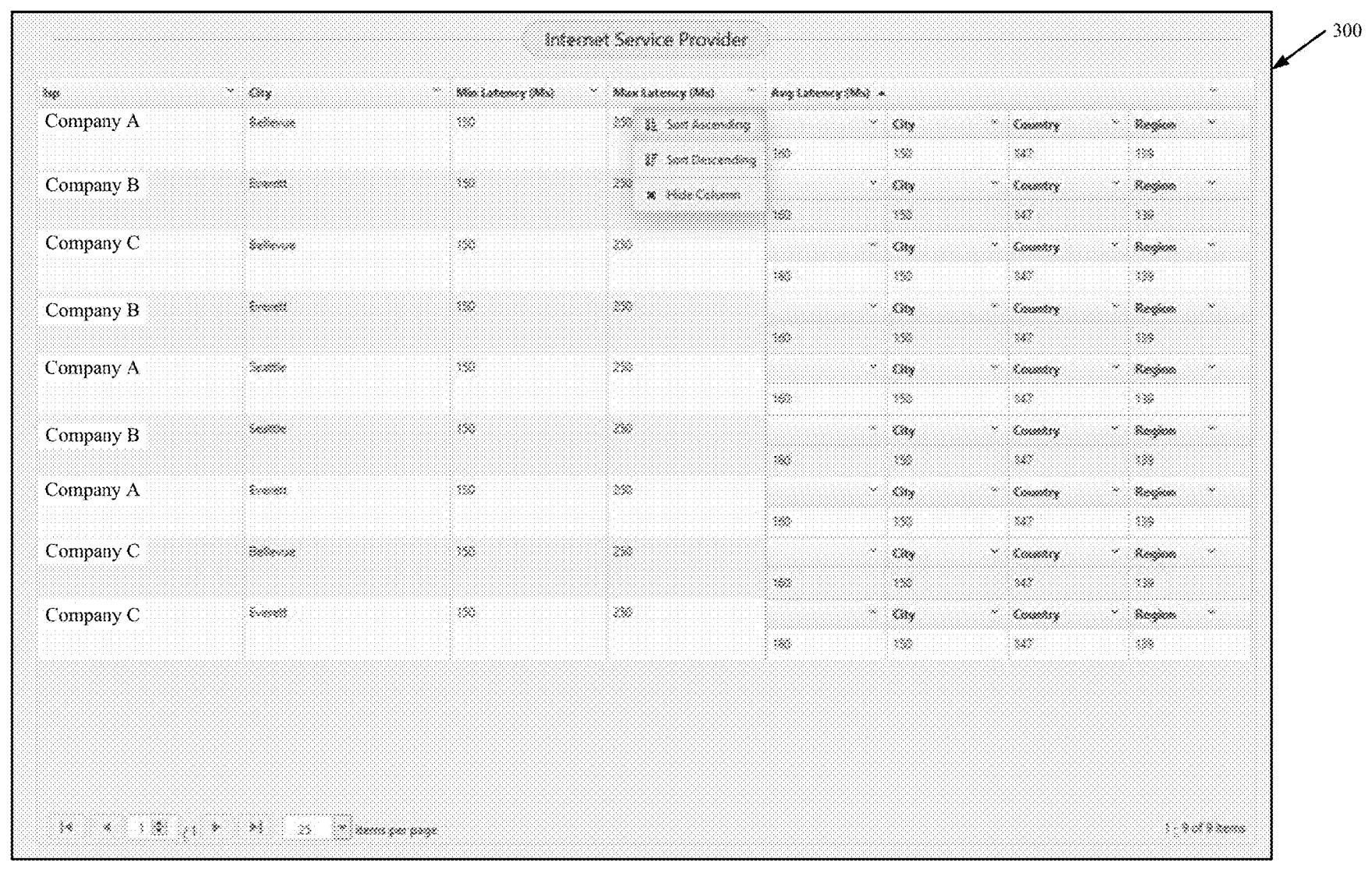
Figure 5:
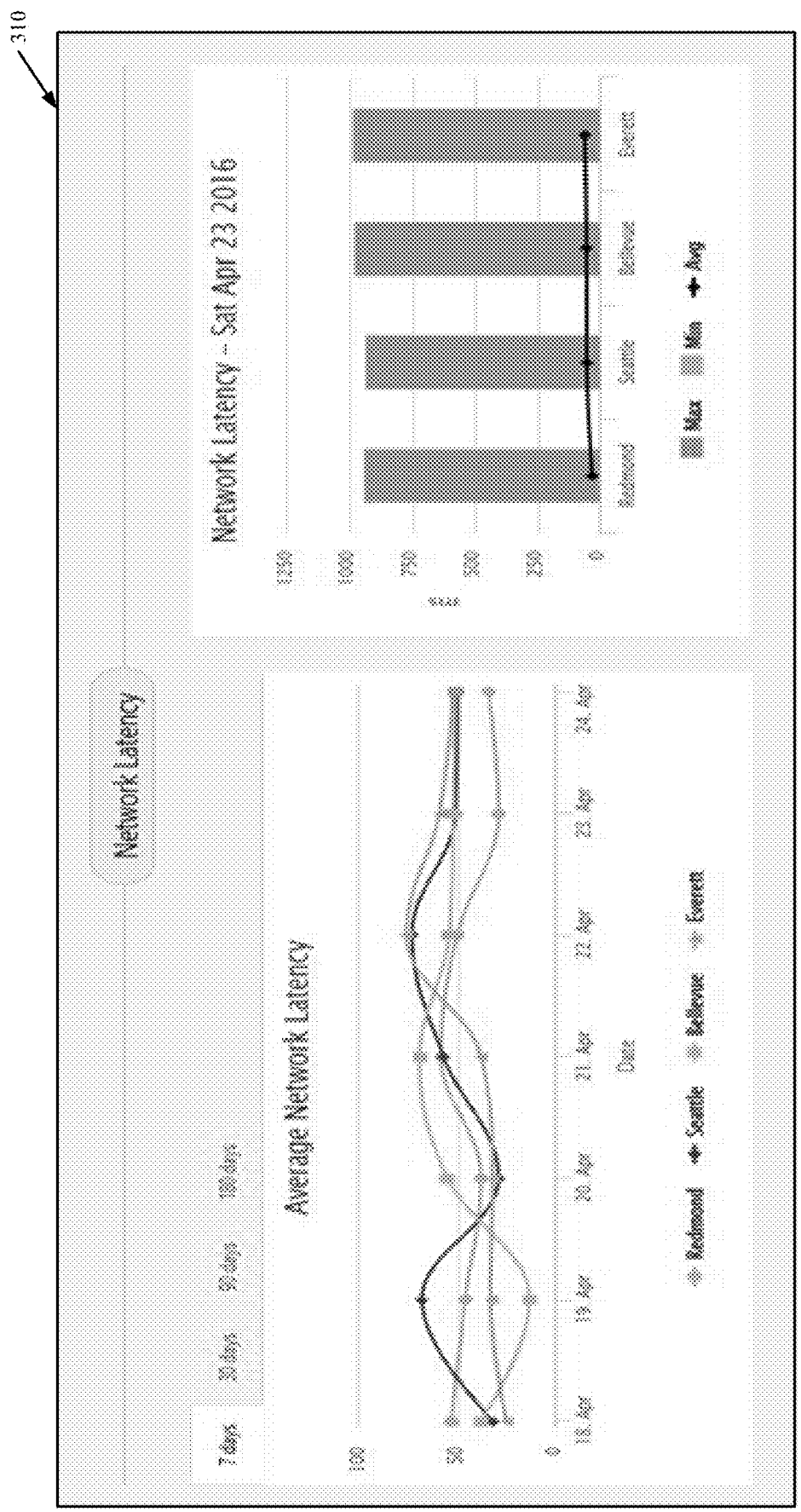
Figure 6:
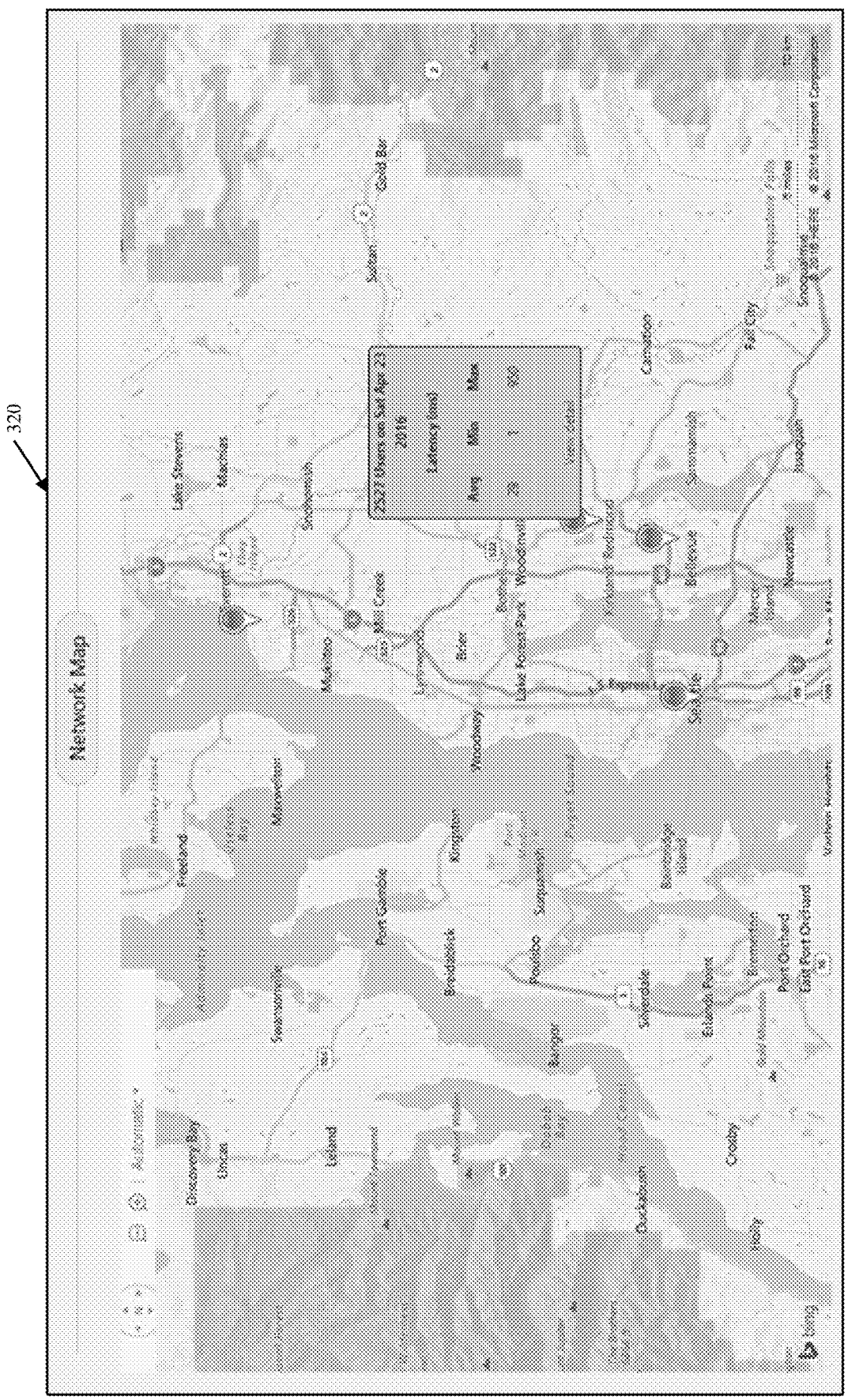

FIGS. 4-6 show examples of different user interfaces that can be generated and surfaced for user interaction, based upon the pivoted data and other data detected or generated in electronic mail computing system 102. FIG. 4, shows one example of a user interface display 300 that can be generated for user interaction. User interface display 300 shows, for instance, the maximum and minimum latencies for a particular city, pivoted based on the service provider that is providing the service. The average latencies are also pivoted further based upon city, country, and region criteria.

FIG. 5 shows another example of a user interface display 310 that can be generated for user interaction. User interface display 310 includes a set of graphical displays that show the trend of network latency for a particular time period, which can be selected by the user. The bar chart on the right of display 310 shows a current (or one day old) snapshot of the latency. The trend data can be for a particular location, or based on other granularity or criteria.

FIG. 6 shows another example of a user interface display 320, that can be generated and surfaced for user interaction. User interface display 320 shows tenant locations (for a given tenant) on a map with corresponding network latency. The map also shows the number of users for each location, as a snapshot. The map display can also be provided with one or more actuators that can be actuated by the user. For instance, detailed trace route information can be provided in tabular form (or in any other desired form), when the user actuates a "view detail" actuator or link displayed on display 320. It will be appreciated that this is just one example of an actuator that can be provided, and a wide variety of others can be provided as well.

The present discussion illustrates a system in which per-hop latency information is aggregated over a tenant and surfaced for various processes. This is significantly different than a system which identifies the overall latency of an e-mail message from a sender to a recipient. Instead, with per-hop latency information aggregated, choke points can be identified and dealt with very quickly. Control signals can be generated to automatically re-route e-mail messages around choke points, or to control the e-mail computing system or other computing systems in other ways based upon pivoted data.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
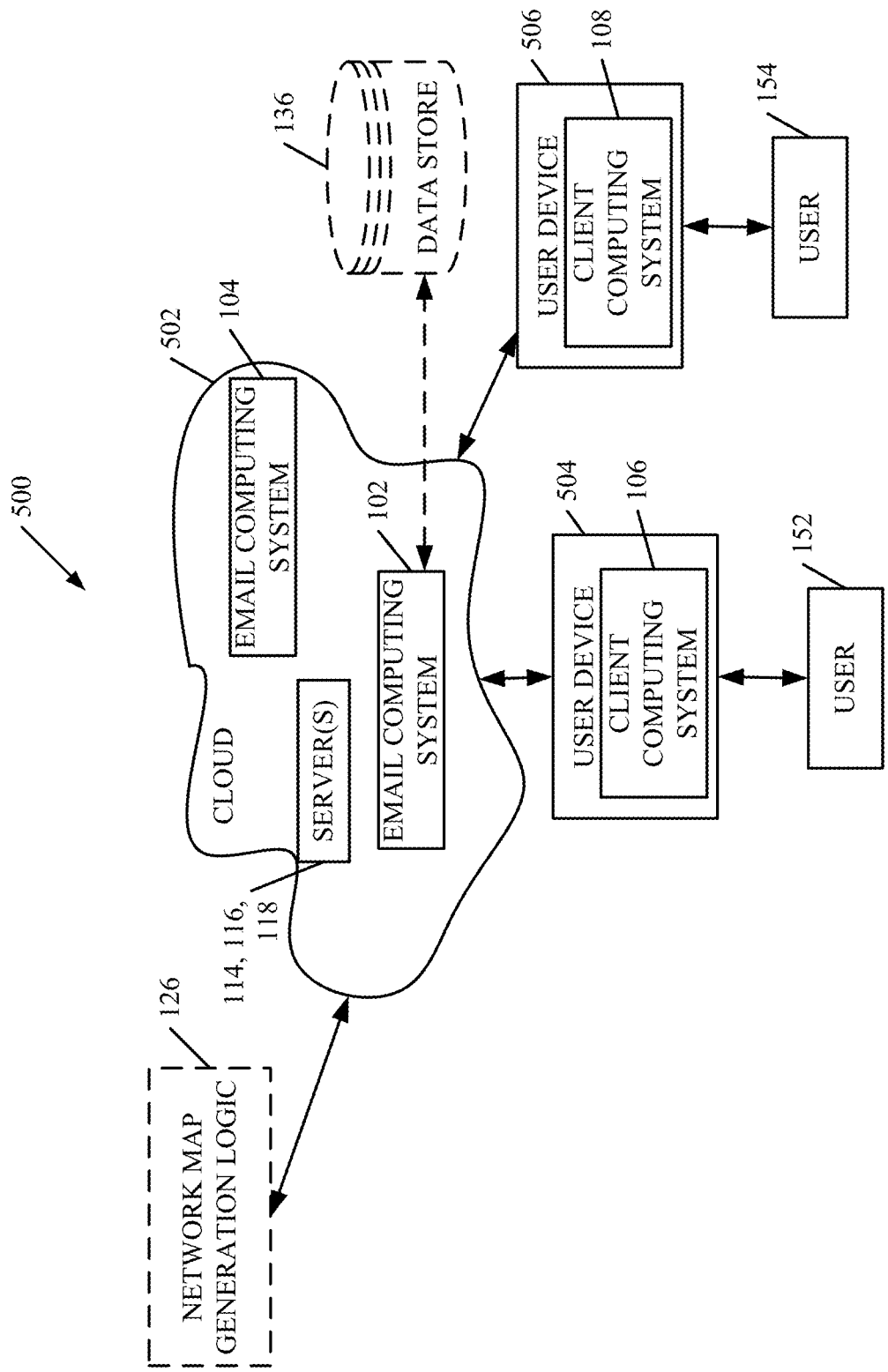
FIG. 7 shows one example of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that some parts of architecture 100 can be located in cloud 502 (which can be public, private, or a combination where portions are public while others are private). Therefore, users 152 and 154 can use user devices 504 and 506 that include client computing systems 106 and 108, respectively, to access those systems through cloud 502.

FIG. 7 also depicts another example of a cloud architecture. FIG. 7 shows that it is also contemplated that some elements of architecture 100 can be disposed in cloud 502 while others are not. By way of example, data store 136 can be disposed outside of cloud 502, and accessed through cloud 502. In another example, network map generation logic 126 can be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
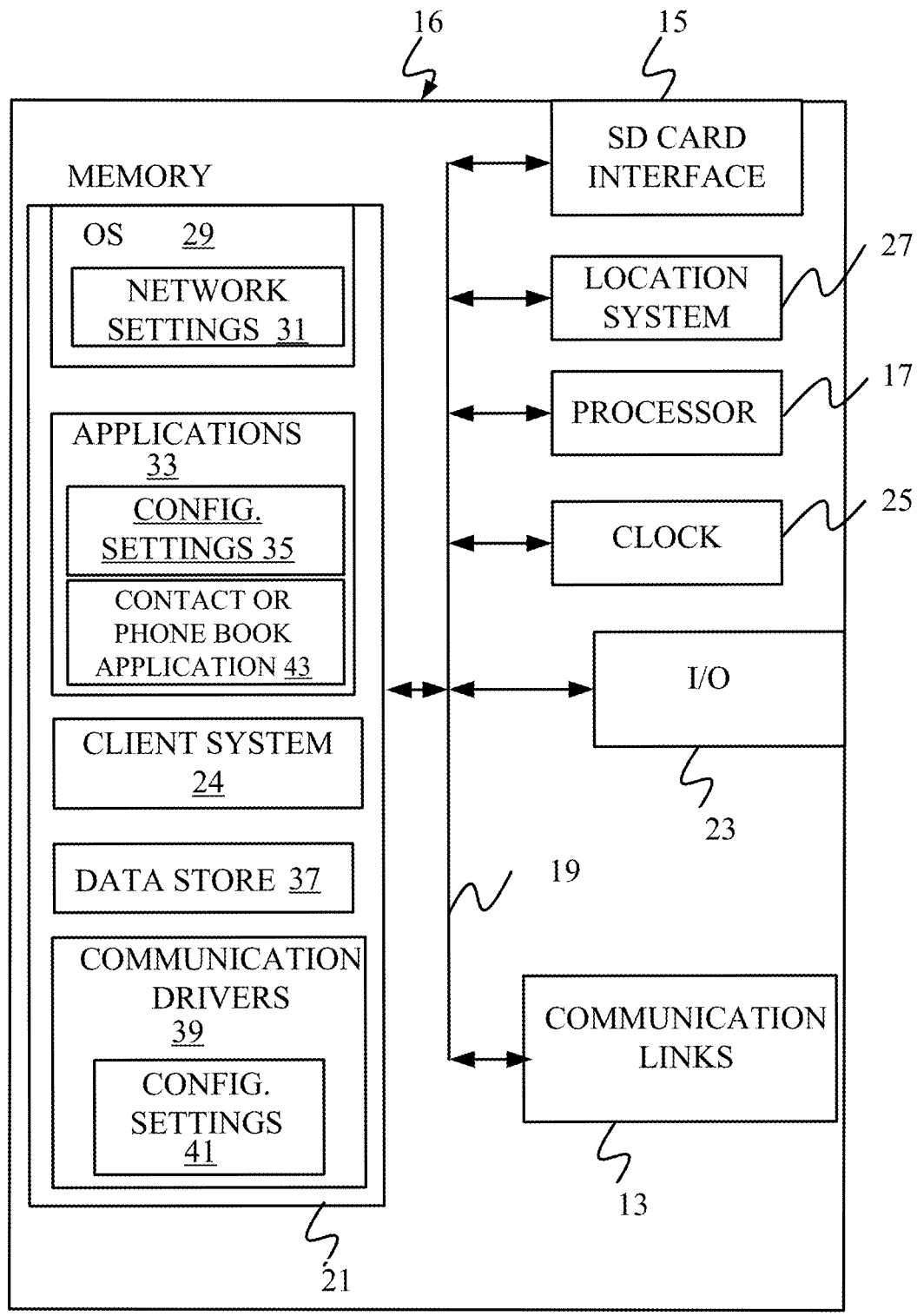
FIGS. 8-10 show examples of mobile devices that can be used in the architectures shown in the previous figures.
Figure 9:
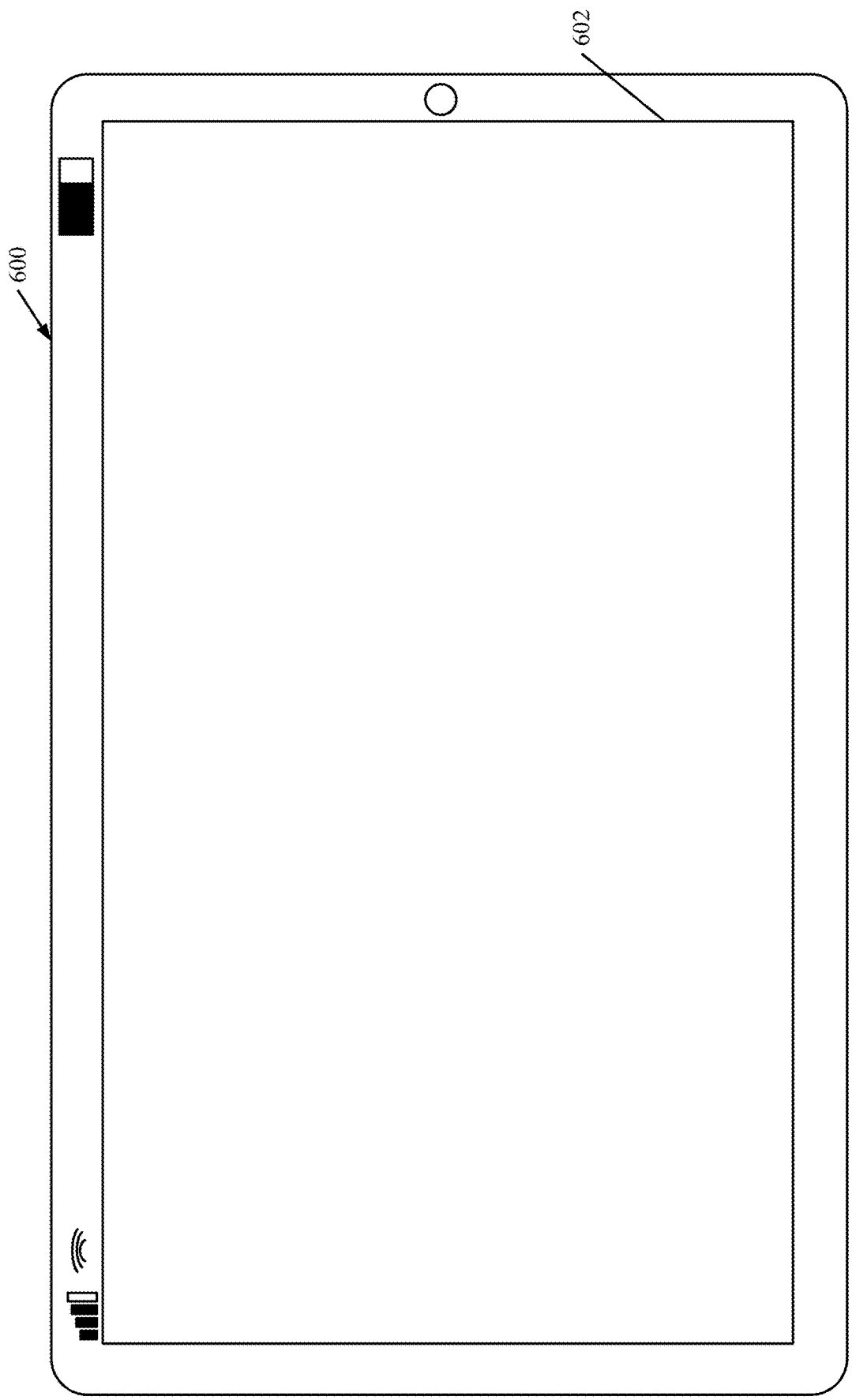
Figure 10:
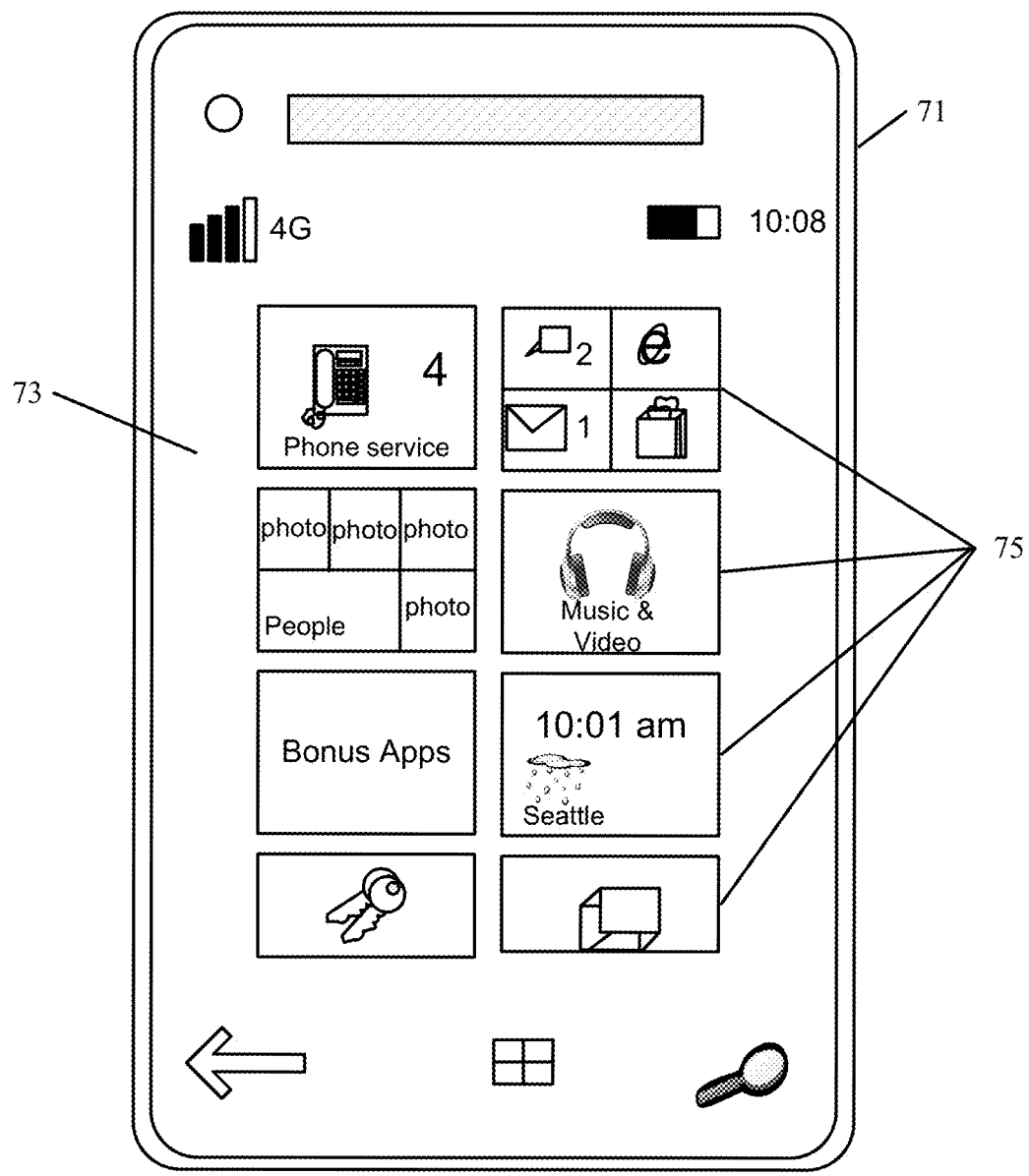

FIG. 8 is a simplified block diagram of one illustrative embodiment of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers 119 or 160 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
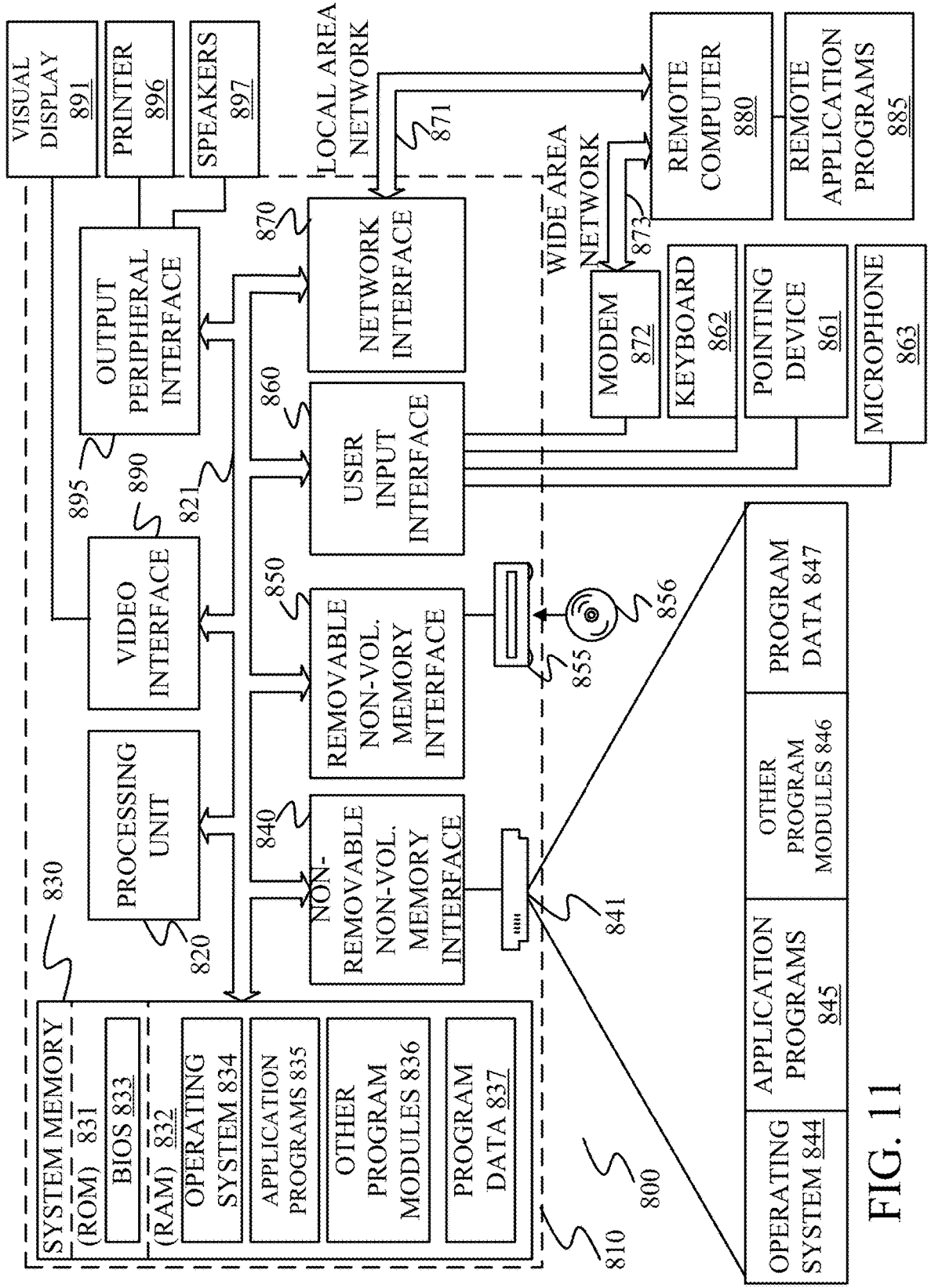
FIG. 11 is a block diagram showing one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers 119, 160), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

data accessing logic that obtains per hop latency information from a client device, the per hop latency information indicating a latency corresponding to an electronic mail (email) message, sent from the client device using an email system, traveling between each pair of adjacent servers on a route to a recipient;

per hop latency logic that identifies the individual per hop latency corresponding to each of the adjacent pairs of servers;

choke point identifier logic that determines whether any server is a choke point, based on the individual per hop latency and, if so, outputs a choke point indicator indicating the server identified as the choke point; and control logic that generates a control signal to control a controllable system based on the choke point indicator.

Example 2 is the computing system of any or all previous examples and further comprising:

route identification logic configured to identify the servers on the route to the recipient, based on the per hop latency information, and identify the servers, on the route, to the per hop latency logic.

Example 3 is the computing system of any or all previous examples wherein the email system is accessed by a plurality of different tenants and wherein the data accessing logic obtains per hop latency information from a plurality of different client devices.

Example 4 is the computing system of any or all previous examples and further comprising:

data aggregation logic configured to aggregate the per hop latency information from the plurality of different client devices and aggregates it on a per tenant basis.

Example 5 is the computing system of any or all previous examples wherein the control logic comprises:

re-routing logic configured to control the email system to route email messages around the server identified as a choke point.

Example 6 is the computing system of any or all previous examples wherein the control logic comprises:

communication logic configured to control the email system to communicate to a service provider the choke point indicator.

Example 7 is the computing system of any or all previous examples and further comprising:

location pivoting logic configured to aggregate the per hop latency information based on geographical location of the servers.

Example 8 is the computing system of any or all previous examples and further comprising:

data surfacing logic configured to surface a representation of the per hop latency information on a map display showing latency corresponding to servers at different physical locations.

Example 9 is the computing system of any or all previous examples and further comprising:

comparison logic configured to compare the per hop latency information for a tenant to per hop latency information for a different tenant and generate a representation of the comparison, the data surfacing logic surfacing the representation of the comparison.

Example 10 is the computing system of any or all previous examples wherein the comparison logic is configured to compare the per hop latency information based on differences in infrastructure used by the tenants.

Example 11 is the computing system of any or all previous examples wherein the comparison logic is configured to compare the per hop latency information based on geographic location of the tenants.

Example 12 is a computer implemented method, comprising:

obtaining per hop latency information from a client device, the per hop latency information indicating a latency corresponding to an electronic mail (email) message, sent from the client device using an email system, traveling between each pair of adjacent servers on a route to a recipient;

identifying the individual per hop latency corresponding to each of the adjacent pairs of servers;

identifying whether any server is a choke point, based on the individual per hop latency;

if so, outputting a choke point indicator indicating the server identified as the choke point; and generating a control signal to control a controllable system based on the choke point indicator.

Example 13 is the computer implemented method of any or all previous examples wherein the email system is accessed by a plurality of different tenants and wherein obtaining the per hop latency information comprises:

obtaining per hop latency information from a plurality of different client devices.

Example 14 is the computer implemented method of any or all previous examples and further comprising:

aggregating the per hop latency information from the plurality of different client devices and on a per tenant basis.

Example 15 is the computer implemented method of any or all previous examples wherein generating a control signal comprises:

generating a re-routing control signal to control the email system to route email messages around the server identified as a choke point.

Example 16 is the computer implemented method of any or all previous examples wherein generating a control signal comprises:

generating a communication control signal to control the email system to communicate, to a service provider, the choke point indicator.

Example 17 is the computer implemented method of any or all previous examples and further comprising:

aggregating the per hop latency information based on geographical location of the servers; and surfacing a representation of the per hop latency information on a map display showing latency corresponding to servers at different physical locations.

Example 18 is the computer implemented method of any or all previous examples and further comprising:

comparing the per hop latency information for a tenant to per hop latency information for a different tenant;

generating a representation of the comparison; and surfacing the representation of the comparison.

Example 19 is the computer implemented method of any or all previous examples wherein comparing comprises:

comparing the per hop latency information based on differences in infrastructure used by the tenants; and comparing the per hop latency information based on geographic location of the tenants.

Example 20 is a computing system, comprising:

data accessing logic that obtains per hop latency information from a plurality of different client devices corresponding to a tenant, the per hop latency information indicating a latency corresponding to an electronic mail (email) message, sent from any of the client devices using an email system, traveling between each pair of adjacent servers on a route to a recipient;

per hop latency logic that identifies the individual per hop latency corresponding to each of the adjacent pairs of servers;

choke point identifier logic that determines whether any server is a choke point, based on the individual per hop latency and, if so, outputs a choke point indicator indicating the server identified as the choke point;

control logic that generates a control signal to control a controllable system based on the choke point indicator; and data surfacing logic configured to surface a representation of the per hop latency information on a map display showing latency corresponding to servers at different physical locations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   receive, by the computing system from a client device, route data collected by route data collection logic on the client device, wherein the route data
      identifies a set of servers that an electronic mail (email) message, sent from the client device using an email system, travels through on a route to a recipient, and
      includes per hop latency information indicating a latency corresponding to the electronic mail (email) message traveling between each pair of adjacent servers on the route to the recipient;
   identify an individual per hop latency corresponding to each of the adjacent pairs of servers;
   determine, based on the individual per hop latencies, that at least one of the servers is a choke point;
   based on the determination, output a choke point indicator indicating the at least one server identified as the choke point; and
   generate a control signal to control a controllable system based on the choke point indicator.

2. The computing system of claim 1 wherein the instructions cause the computing system to:
   receive, from the client device, configuration data representing configuration settings of the client device; and
   output the choke point indicator based on the configuration data.

3. The computing system of claim 1 wherein the email system is accessed by a plurality of different tenants and wherein the instructions cause the computing system to obtain per hop latency information from a plurality of different client devices.

4. The computing system of claim 3 wherein the instructions cause the computing system to:
   aggregate the per hop latency information from the plurality of different client devices on a per tenant basis.

5. The computing system of claim 4 wherein the instructions cause the computing system to:
   control the email system to route email messages around the server identified as a choke point.

6. The computing system of claim 4 wherein the instructions cause the computing system to:
   control the email system to communicate to a service provider the choke point indicator.

7. The computing system of claim 4 wherein the instructions cause the computing system to:
   aggregate the per hop latency information based on geographical location of the servers.

8. The computing system of claim 7 wherein the instructions cause the computing system to:
   surface a representation of the per hop latency information on a map display showing latency corresponding to servers at different physical locations.

9. The computing system of claim 8 wherein the instructions cause the computing system to:
   compare the per hop latency information for a tenant to per hop latency information for a different tenant;
   generate a representation of the comparison; and
   surfacing the representation of the comparison.

10. The computing system of claim 8 wherein the instructions cause the computing system to compare the per hop latency information based on differences in infrastructure used by the tenants.

11. The computing system of claim 8 wherein the instructions cause the computing system to compare the per hop latency information based on geographic location of the tenants.

12. A computer implemented method, comprising:
    obtaining per hop latency information from a plurality of different client devices, the per hop latency information indicating a latency corresponding to an electronic mail (email) messages, sent from the client device using an email system, traveling between each pair of adjacent servers on a route to a recipient, wherein the email system is accessed by a plurality of different tenants;
    aggregating the per hop latency information, from the plurality of different client devices, on a per tenant basis;
    identifying the individual per hop latency corresponding to each of the adjacent pairs of servers;
    identifying that a particular server is a choke point based on the individual per hop latency;
    outputting a choke point indicator indicating the server identified as the choke point; and
    generating a control signal to control a controllable system based on the choke point indicator.

13. The computer implemented method of claim 12 wherein generating a control signal comprises:
    generating a re-routing control signal to control the email system to route email messages around the server identified as a choke point.

14. The computer implemented method of claim 12 wherein generating a control signal comprises:
    generating a communication control signal to control the email system to communicate, to a service provider, the choke point indicator.

15. The computer implemented method of claim 12 and further comprising:
    aggregating the per hop latency information based on geographical location of the servers; and
    surfacing a representation of the per hop latency information on a map display showing latency corresponding to servers at different physical locations.

16. The computer implemented method of claim 15 and further comprising:
    comparing the per hop latency information for a tenant to per hop latency information for a different tenant;
    generating a representation of the comparison; and
    surfacing the representation of the comparison.

17. The computer implemented method of claim 16 wherein comparing comprises:
    comparing the per hop latency information based on differences in infrastructure used by the tenants; and
    comparing the per hop latency information based on geographic location of the tenants.

18. A computing system, comprising:
    at least one processor; and
    memory storing instructions executable by the at least one processor, wherein the instructions, when executed, provide:
        data accessing logic that obtains per hop latency information from a plurality of different client devices corresponding to a tenant, the per hop latency information indicating a latency corresponding to an electronic mail (email) message, sent from any of the client devices using an email system, traveling between each pair of adjacent servers on a route to a recipient;
        per hop latency logic that identifies the individual per hop latency corresponding to each of the adjacent pairs of servers;
        choke point identifier logic that determines whether any server is a choke point, based on the individual per hop latency and, if so, outputs a choke point indicator indicating the server identified as the choke point;
        control logic that generates a control signal to control a controllable system based on the choke point indicator; and
        data surfacing logic configured to surface a representation of the per hop latency information on a map display showing latency corresponding to servers at different physical locations.

19. The computing system of claim 18, wherein the email system is accessed by a plurality of different tenants and the data accessing logic is configured to obtain per hop latency information from client devices associated with the plurality of different tenants.

20. The computing system of claim 19, wherein the per hop latency logic is configured to aggregate the per hop latency information from the plurality of different client devices on a per tenant basis.

* * * * *